May 6, 1930.   C. GEFFKEN   1,757,942
COMBINATION HOE AND RAKE
Filed June 26, 1928
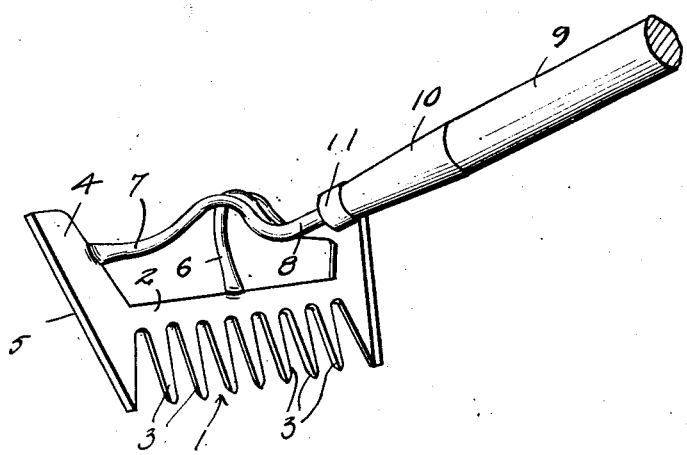
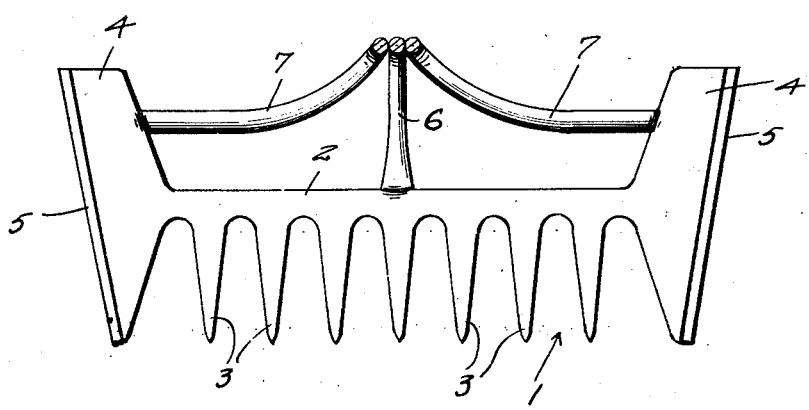
Inventor
Claus Geffken
By Watson E. Coleman
Attorney Patented May 6, 1930

1,757,942

UNITED STATES PATENT OFFICE

CLAUS GEFFKEN, OF BURLINGTON, WASHINGTON, ASSIGNOR OF TWENTY-FOUR AND ONE-HALF PER CENT TO ARTHUR G. FRANKLIN AND TWENTY-FOUR AND ONE-HALF PER CENT TO VICTOR H. CRESSEY

COMBINATION HOE AND RAKE

Application filed June 26, 1928. Serial No. 288,457.

This invention relates to a garden tool and pertains particularly to a combination hoe and rake.

The primary object of this invention is to provide a combination tool for use where hoeing, raking, or cutting operations are to be performed, so that such operations can all be performed with the same tool, thus expediting the work and saving greatly in both time and labor.

The present tool is especially useful in berry culture where the hoe portion can be employed for cutting away runners or vines and weeds and the rake used to gather the same up for burning. The provision of two cutting edges or hoes, one at each side of the rake, is an advantage in cutting out or blocking out between plants which are arranged in rows as it allows the operator to stand between two rows, taking the two at one trip.

Another object of the invention is to provide a combination garden tool of the character described which, having the rake and hoe portion formed in one piece will be inexpensive to manufacture.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a perspective view of the tool;

Figure 2 is a view in elevation of the inner face of the same.

Referring to the drawing in detail, wherein like numerals of reference indicate corresponding parts throughout the several views, the numeral 1 indicates generally the rake portion of the tool which, as shown, comprises a relatively long back portion 2 from which the teeth 3 project. the teeth extending throughout the length of the back in the usual manner.

At each end of the back portion 2, there is formed a hoe wing 4 which extends upwardly from the rake back.

Each of the hoe wings 4 has its outer edge beveled or sharpened to provide the cutting edge 5 which extends throughout the outer edge of the adjacent end tooth of the rake, to the point of the same. The rake structure 1 and wings 4 which constitute the hoe portions, are preferably formed in one piece from a solid sheet of metal.

From the central portion of the rake back 2 there extends upwardly an arm 6 and from the inner or back edge of each hoe portion 4 there extends inwardly toward the center of the tool, an arm 7, the arms 7 and the single arm 6 meeting at the central portion of the tool and at a point substantially in alinement with the top edges of the hoes from which point the three arms curve downwardly and then extend in a direction at substantially right angles to one face of the tool joining to form the tang 8. To this tang a suitable handle 9 is attached, the handle having over its inner end the usual reinforcing sleeve 10 and ferrule 11.

From the foregoing description it will be readily seen that the herein described garden tool is of simple design and may be inexpensively manufactured and retailed.

Having described my invention what I claim is:—

A tool of the character described, comprising an elongated flat body formed to provide a plurality of tines each end of the body being enlarged and extending in a direction substantially parallel to said tines to form a hoe, the outer edge of each hoe being obliquely angled with respect to the longitudinal axis of said body and sharpened, a handle, and a plurality of arms connecting the handle to the body, two thereof being connected to and extending from the back edge of a hoe and one connected to the edge of the body intermediate its ends, said arms being brought together and joined at substantially the transverse center of the body.

In testimony whereof I hereunto affix my signature.

CLAUS GEFFKEN.